US012752740B2

(12) United States Patent
Li et al.

(10) Patent No.: US 12,752,740 B2
(45) Date of Patent: Oct. 6, 2026

(54) VEHICLE CONTROL SYSTEM AND METHOD

(71) Applicants: HYUNDAI MOTOR COMPANY, Seoul (KR); KIA CORPORATION, Seoul (KR)

(72) Inventors: Xi Sha Li, Shandong (CN); Kyong Ho Shon, Hwaseong-si (KR); Jin Shun Li, Shandong (CN); In Sik Chun, Hwaseong-si (KR); Hang Hang Wang, Shandong (CN)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/976,772

(22) Filed: Dec. 11, 2024

(65) Prior Publication Data

US 2026/0159035 A1 Jun. 11, 2026

(30) Foreign Application Priority Data

Dec. 6, 2024 (CN) ......................... 202411793077.9

(51) Int. Cl.
*B60R 25/33* (2013.01)
*B60R 25/24* (2013.01)

(52) U.S. Cl.
CPC .............. *B60R 25/33* (2013.01); *B60R 25/24* (2013.01); *B60R 2325/101* (2013.01); *B60R 2325/207* (2013.01)

(58) Field of Classification Search
CPC ... B60R 25/33; B60R 25/24; B60R 2325/101; B60R 2325/207
See application file for complete search history.

(56) References Cited

U.S. PATENT DOCUMENTS

2018/0103414 A1* 4/2018 Golsch .................... B60R 25/24

FOREIGN PATENT DOCUMENTS

| | | | | | |
|---|---|---|---|---|---|
| DE | 102024105052 | A1 * | 8/2025 | ........... | B60R 25/245 |
| KR | 20250069256 | A * | 5/2025 | ............. | B60K 35/85 |
| KR | 102869086 | B1 * | 10/2025 | ............ | H04W 12/03 |
| WO | WO-2020083258 | A1 * | 4/2020 | ............... | G07C 5/00 |

* cited by examiner

*Primary Examiner* — Steven Lim
*Assistant Examiner* — James E Munion
(74) *Attorney, Agent, or Firm* — MCDONNELL BOEHNEN HULBERT & BERGHOFF LLP

(57) ABSTRACT

According to an embodiment, there is provided a vehicle control system including a user terminal configured to determine whether to enter a first area with respect to a vehicle using a satellite navigation system signal and request wake-up signal transmission when entering the first area, a server configured to transmit a wake-up signal to the vehicle in response to the wake-up signal transmission request from the user terminal, and a processor configured to switch operation modes of a Bluetooth module of the vehicle and an audio video navigation and telematics (AVNT) from a first mode to a second mode in response to the wake-up signal.

14 Claims, 6 Drawing Sheets

100: AVNT
200: PROCESSOR
300: COMMUNICATION DEVICE
310, 320, 330, 340: POSITIONING MODULE

| | | | | | |
|---|---|---|---|---|---|
| Start | Bluetooth Paring | Module Wake up (POWER-SAVING MODE → NORMAL MODE) | AVNT Wake up (CAN Network Wake up) | Security Channel Establishment | End |

VEHICLE CONTROL SYSTEM AND METHOD

CROSS-REFERENCE TO RELATED APPLICATION(S)

This application claims priority to and the benefit of Chinese Patent Application No. 202411793077.9, filed on Dec. 6, 2024, the entire contents of which are incorporated herein by reference.

TECHNICAL FIELD

The present disclosure relates to a vehicle control system and method.

BACKGROUND

A passive-entry-passive-start (PEPS) function can estimate a position of a smartphone through a communication module mounted on a vehicle and then (e.g., automatically) perform operations such as door locking/unlocking and starting of the vehicle.

After entering a Bluetooth connectable area, a vehicle owner connects a Bluetooth communication channel between a smartphone application and a vehicle and receives the PEPS function according to his or her position.

However, in the Bluetooth connection process, when the smartphone provided with a digital key approaches the vehicle in a Bluetooth communication shadow area, Bluetooth connection is not immediately established, and a process of switching a Bluetooth module to a connectable state is used (e.g., required). In addition, to receive the PEPS function, an audio video navigation and telematics (AVNT) is (e.g., needs to be) switched to an operable state.

Therefore, connection is delayed, causing possible frustration.

SUMMARY

The present disclosure is directed to providing a vehicle control system and method, which are capable of recognizing a digital key approaching a vehicle in a Bluetooth communication shadow area to (e.g., automatically) perform a preliminary operation for providing Bluetooth connection and a passive-entry-passive-start (PEPS) function.

According to an embodiment, there is provided a vehicle control system including a user terminal configured to determine whether to enter a first area with respect to a vehicle using a satellite navigation system signal and request wake-up signal transmission when entering the first area, a server configured to transmit a wake-up signal to the vehicle in response to the wake-up signal transmission request from the user terminal, and a processor configured to switch operation modes of a Bluetooth module of the vehicle and an audio video navigation and telematics (AVNT) from a first mode to a second mode in response to the wake-up signal.

The user terminal may be connected to the Bluetooth module of the vehicle that operates in the second mode when entering a second area with respect to the vehicle.

The first area and the second area may have ranges set with respect to the vehicle, and the range of the first area may be wider than that of the second area.

The range of the first area may be set using the time (e.g., required) for the Bluetooth module of the vehicle and the AVNT to switch to the second mode and a walking speed.

When the user terminal does not enter the second area within a preset threshold time after switching to the second mode, the processor may switch the operation modes of the Bluetooth module of the vehicle and the AVNT from the second mode to the first mode.

The threshold time may be set using the range of the first area, the range of the second area, and the walking speed.

The processor may transmit parking position information of the vehicle measured through the satellite navigation system to the server when parking of the vehicle is completed.

The user terminal may receive the satellite navigation system signal corresponding to a parking position of the vehicle from the server.

The user terminal may determine reliability according to an error range of the satellite navigation system signal.

The user terminal may stop the wake-up signal transmission request when the reliability of the satellite navigation system signal is a reference level or less.

The first mode may be a sleep mode or a power-saving mode, and the second mode may be a normal mode or a standby mode.

According to an embodiment, there is provided a vehicle control method including determining, by a user terminal, whether to enter a first area with respect to a vehicle using a satellite navigation system signal, requesting, by the user terminal, a server to transmit a wake-up signal when it is determined that the user terminal has entered the first area, transmitting, by the server, a wake-up signal to the vehicle in response to the wake-up signal transmission request from the user terminal, and switching, by a processor of the vehicle, operation modes of a Bluetooth module of the vehicle and an audio video navigation and telematics (AVNT) from a first mode to a second mode in response to the wake-up signal.

The vehicle control method may further include connecting the user terminal to the Bluetooth module of the vehicle that operates in the second mode when the user terminal enters a second area with respect to the vehicle.

The first area and the second area may have ranges set with respect to the vehicle, and the range of the first area may be wider than that of the second area.

The range of the first area may be set using the time (e.g., required) for the Bluetooth module of the vehicle and the AVNT to switch to the second mode and a walking speed.

The vehicle control method may further include, by the processor, determining whether the user terminal has entered the second area within a preset threshold time, and switching the operation modes of the Bluetooth module of the vehicle and the AVNT from the second mode to the first mode when the user terminal does not enter the second area.

The threshold time may be set using the range of the first area, the range of the second area, and the walking speed.

The vehicle control method may further include, before the determining of whether to enter the first area, transmitting, by the processor, parking position information of the vehicle measured through the satellite navigation system to the server when parking of the vehicle is completed.

The vehicle control method may further include, before the determining of whether to enter the first area, receiving, by the user terminal, the satellite navigation system signal corresponding to a parking position of the vehicle from the server.

The vehicle control method may further include, before the determining of whether to enter the first area, determining, by the user terminal, reliability according to an error range of the satellite navigation system signal, and stopping, by the user terminal, the wake-up signal transmission request when the reliability of the satellite navigation system signal is a reference level or less.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
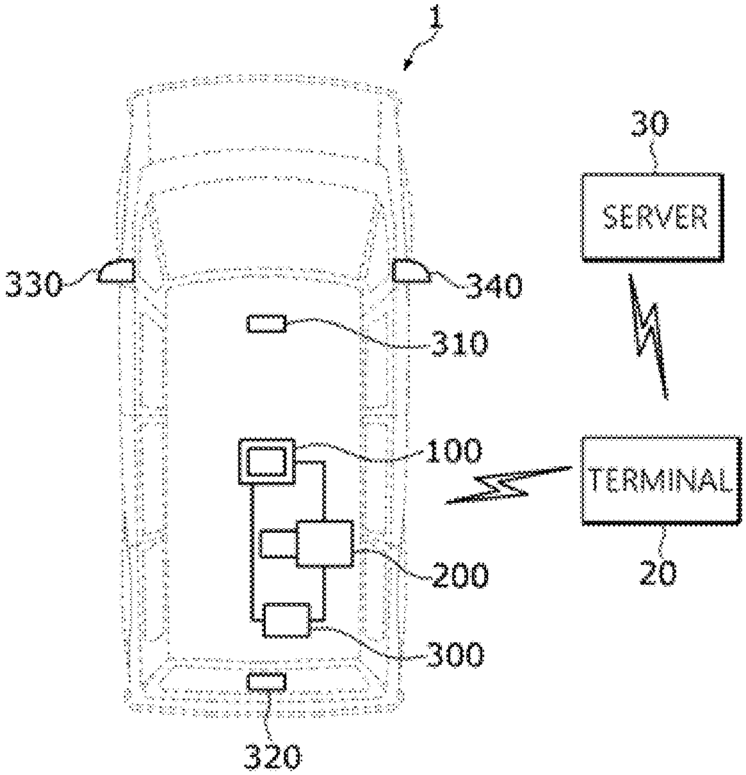
FIG. 1 is a view for describing a vehicle according to an embodiment.

Hereinafter, exemplary embodiments of the present disclosure will be described in detail with reference to the accompanying drawings.

However, the technical spirit of the present disclosure is not limited to some of the described embodiments, but may be implemented in various different forms, and one or more of the components among the embodiments may be used by being selectively coupled or substituted without departing from the scope of the technical spirit of the present disclosure.

In addition, terms (including technical and scientific terms) used in embodiments of the present disclosure may be construed as meaning that may be generally understood by those skilled in the art to which the present disclosure pertains unless explicitly specifically defined and described, and the meanings of the commonly used terms, such as terms defined in a dictionary, may be construed in consideration of contextual meanings of related technologies.

In addition, the terms used in the embodiments of the present disclosure are for describing the embodiments and are not intended to limit the present disclosure.

In the specification, a singular form may include a plural form unless otherwise specified in the phrase, and when described as "at least one (or one or more) of A, B, and C," one or more among all possible combinations of A, B, and C may be included.

In addition, terms such as first, second, A, B, (a), and (b) may be used to describe components of the embodiments of the present disclosure.

These terms are only for the purpose of distinguishing one component from another component, and the nature, sequence, order, or the like of the corresponding components is not limited by these terms.

In addition, when a first component is described as being "connected," "coupled," or "joined" to a second component, it may include a case in which the first component is directly connected, coupled, or joined to the second component, but also a case in which the first component is "connected," "coupled," or "joined" to the second component by other components present between the first component and the second component.

In addition, when the first component is described as being formed or disposed on "on (above) or below (under)" the second component, "on (above)" or "below (under)" may include not only a case in which two components are in direct contact with each other, but also a case in which one or more third components are formed or disposed between the two components. In addition, when described as "on (above) or below (under)," it may include the meaning of not only an upward direction but also a downward direction based on one component.

Hereinafter, embodiments will be described in detail with reference to the accompanying drawings, and the same or corresponding components are denoted by the same reference numeral regardless of the reference numerals, and overlapping descriptions thereof will be omitted.

For purposes of this application and the claims, using the exemplary phrase "at least one of: A; B; or C" or "at least one of A, B, or C" is used to mean "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", or the like as used herein may mean each listed item or all possible combinations of the listed items. For example, "at least one of A or B" may refer to (1) at least one A; (2) at least one B; or (3) at least one A and at least one B.

Throughout the present disclosure, references to components, units, or modules generally refer to items that logically can be grouped together to perform a function or group of related functions. Like reference numerals are generally intended to refer to the same or similar components. Components, units, and modules may be implemented in software, hardware or a combination of software and hardware. The components, units, modules, and/or functions described above may be implemented and/or performed by one or more processors. For examples, the components, units, and/or modules may include processor(s), microprocessor (s), graphics processing unit(s), logic circuit(s), dedicated circuit(s), application-specific integrated circuit(s), programmable array logic, field-programmable gate array(s), controller(s), microcontroller(s), and/or other suitable hardware. The components, units, and/or modules may also include software control module(s) implemented with a processor or logic circuitry for example. The components, units, and/or modules may include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware. One or more storage type media may include any or all of the tangible memory of computers, processors, or the like, or associated modules thereof, such as various semiconductor memories, tape drives, disk drives and the like, which may provide non-transitory storage at any time for software programming.

Figure 2:
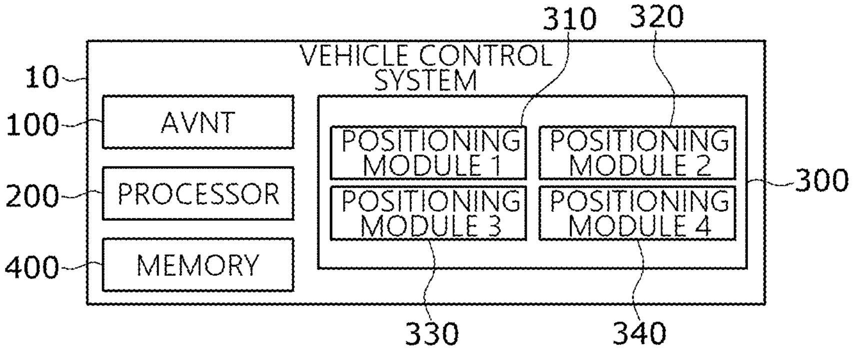
FIG. 2 is a block diagram illustrating a configuration of the vehicle according to the embodiment.

FIG. 1 is a view for describing a vehicle according to an embodiment, and FIG. 2 is a block diagram of illustrating configuration of the vehicle according to the embodiment. Referring to FIGS. 1 and 2, a vehicle 1 according to the embodiment may include an audio video navigation and telematics (AVNT) 100, a processor 200, a communication device 300, and a memory 400.

The vehicle 1 may include the AVNT 100 provided in a center fascia and controlling an audio device, an air conditioner, a Bluetooth device, a seat heater, and the like.

An input device for receiving a user input may be disposed in the center fascia or the AVNT 100, and a display device for displaying operation information for at least one of functions performed in the vehicle 1 may also be disposed.

The input device may include hardware devices such as various buttons or switches, pedals, a keyboard, a mouse, a track-ball, various levers, a handle, or a stick.

In addition, the input device may include a graphical user interface (GUI), that is, a software device, such as a touch pad. The touch pad may be implemented as a touch screen panel (TSP) to form a mutual layer structure with a display panel of the display device.

The display device may function as a user interface. The display device may display the vehicle's operating state, control state, route/traffic information, energy remaining information, content requested by a driver, and the like by a processor. In addition, the display device may be configured as a touch screen capable of detecting a driver input to receive the driver's request that instructs the processor.

The interior of a vehicle body may include a keyway into which a fob type or card type remote controller may be inserted. Here, the keyway may be provided on a dashboard or (e.g., center) fascia and provided at a position adjacent to a driver's seat.

The vehicle 1 may transmit and receive information with a remote controller or a terminal when the remote controller is inserted into the keyway or when authentication with the remote controller or terminal is completed via a wireless communication network.

The interior of the vehicle body may further include a start button that receives on/off commands. Therefore, the vehicle starts when the start button is pressed by the user after the authentication with the remote controller or terminal is completed.

The vehicle 1 may further include a communication device for transmitting and receiving information with at least one of electronic devices and a terminal 20 that are provided in the vehicle.

The communication device 300 may include one or more components that enable communication between in-vehicle components and for example, may include at least one of a short-range communication module, a wired communication module, and a wireless communication module.

In addition, the communication device 300 may include at least one of the wired communication module and/or the wireless communication module for communicating with the user terminal 20 and a server 30.

For example, the short-range communication module may include various short-range communication modules for transmitting and receiving signals using a wireless communication network at a short distance, such as a Bluetooth module, an infrared communication module, a radio frequency (RF) identification communication module, a wireless local access network (WLAN) communication module, a near-field communication (NFC) communication module, or a Zigbee communication module.

For example, the wired communication module may include not only various wired communication modules such as a controller area network (CAN) communication module, a local area network (LAN) module, a wide area network (WAN) module, and a value added network (VAN) module, but also various cable communication modules such as a universal serial bus (USB), a high definition multimedia interface (HDMI), a digital visual interface (DVI), a recommended standard 232 (RS-232), power line communication, and plain old telephone service (POTS).

For example, a controller area network (CAN) may include (e.g., comprise) a communication protocol designed for real-time data exchange between microcontrollers and devices within vehicles and industrial systems. CAN may allow multiple electronic control units to communicate with each other without (e.g., the need for) a host computer, making it useful for applications where reliable, high-speed communication is useful (e.g., critical).

For example, a value added network (VAN) may comprise a private network that may provide businesses with secure, reliable communication channels for exchanging data and documents. VANs may offer services (e.g., data encryption, format translation, message routing, or tracking, or the like) to ensure that business documents (e.g., invoices, purchase orders, or shipping notices, or the like) may be transmitted efficiently and/or securely between trading partners.

The wired communication module may further include a local interconnect network (LIN). For example, a local interconnect network (LIN) may include (e.g., comprise a low-cost serial communication protocol that may be used in automotive systems to connect electronic components (e.g., sensors, actuators, or control units, or the like). For example, for simplicity and/or cost-efficiency, LIN may manage functions that do not use (e.g., require) high-speed data transfer (e.g., window controls, seat adjustments, lighting, or climate control, or the like). LIN may function on a single-master, multiple-slave architecture, where one master node may coordinate communication with multiple slave nodes.

In addition, in addition to the Wi-Fi module and the wireless broadband (WiBro) module, the wireless communication module may include a wireless communication module for supporting various wireless communication methods, such as global system for mobile communication (GSM), code division multiple access (CDMA), wideband code division multiple access (WCDMA), universal mobile telecommunications system (UMTS), time division multiple access (TDMA), and long term evolution (LTE).

The user terminal 20 communicates with the vehicle 1, receives at least one of a vehicle door lock and unlock command, a tailgate lock and unlock command, a start command, a lamp lighting command, and a start command as a user input, and transmits information corresponding to the received command to the vehicle. The user terminal 20 may transmit the information corresponding to the received command to the vehicle as a communication signal.

The user terminal 20 may be implemented as a computer or portable terminal that can be communicatively connected to the vehicle via a network.

Here, the computer may include, for example, a notebook, desktop, laptop, tablet PC, slate PC, or the like that is provided with a WEB browser, and the portable terminal is a wireless communication device that ensures portability and mobility and may include, for example, any kind of handheld-based wireless communication device such as a personal communication system (PCS), a GSM, a personal digital cellular (PDC), a personal handyphone system (PHS), a personal digital assistant (PDA), an international mobile telecommunication (IMT)-2000, CDMA-2000, WCDMA, and wireless broadband Internet (WiBro) terminals, and a smartphone, and wearable devices such as a watch, a ring, a bracelet, an anklet, a necklace, glasses, contact lenses, or a head-mounted-device (HMD).

In an embodiment, the user terminal 20 may communicate with the vehicle through a Bluetooth low energy (BLE)

communication method. The user terminal 20 may perform communication based on the Bluetooth beacon standard (iBeacon).

The AVNT 100 is the term referring to an in-vehicle information and entertainment system and may be a system that integrates navigation, audio, video, and communication functions. The AVNT 100 may output a message generated by the processor 200 in at least one of a visual manner, an audible manner, or a combination thereof.

The AVNT 100, the processor 200, and the communication device 300 may be implemented as one module, but in the embodiment, will be described separately for convenience of description.

The AVNT 100 may be a component for providing a hardware interface integrated into the system in the vehicle. The AVNT 100 may perform system control for a screen, buttons, and various integrated information and entertainment functions.

The AVNT 100 may be installed at the center or console of the vehicle dashboard to provide vehicle information and an entertainment interface. The information and entertainment system may include AM/FM radio, satellite radio, DVDs/CDs, cassette tapes, USB MP3, dashcams, GPS navigation devices, Bluetooth, Wi-Fi, and the like and also provide the state information of the vehicle system. In addition, the AVNT 100 may perform functions such as voice control and motion recognition.

The processor 200 may control the vehicle body such as a vehicle, doors, windows, or keys (e.g., a digital key, a smartphone key, and a fob). The processor may perform a body control function (BCM), a smart key entry/start function (SMK), a tire air pressure monitoring function (TPMS), an immobilizer function (IMMO), digital key authentication (IAU), an autonomous parking related control function (PDW), and the like. For example, the processor 200 may be a body domain controller (BDC), but is not limited thereto, and may be used to encompass a platform controller for providing electronic convenience functions to a body domain area.

The communication device 300 may perform pairing between the user terminal 20 and the vehicle 1 using a Bluetooth signal.

The communication device 300 may include a transceiver for transmitting and receiving information using an antenna, a communication circuit, a communication processor, and the like and perform short-range communication with the user terminal 20. According to an embodiment, the communication device 300 may perform Bluetooth communication, NFC communication, or UWB communication. The communication device 300 may be provided near a door handle of the vehicle 1 to request authentication information when it is determined that the user terminal approaches within a predetermined distance.

In the Bluetooth standard, Bluetooth 1.0 stipulates that a data transmission rate is 1 Mbps and a transmission distance ranges from 10 to 100 m, and communication is possible even in the presence of obstacles because Bluetooth 1.0 uses a high radio frequency of 2.4 GHz.

The communication device 300 according to the embodiment may measure the position of the user terminal under the control of the processor 200 when the user terminal including a digital key approaches the outside of the vehicle 1, unlock the vehicle door according to the result of positioning, and control the remote start of the vehicle 1.

The communication device 300 may include a plurality of positioning modules 310 to 340. The positioning modules 310 to 340 may be short-range wireless communication modules, and each wireless communication module may measure the strength of a wireless signal received from the user terminal. One of the plurality of wireless communication modules mounted on the vehicle 1 may be set as a master module. The master module may collect the strength of a wireless signal measured by another wireless communication module and transmit the strength to the processor.

For example, the positioning modules 310, 320, 330, 340 may be composed of a Bluetooth module, a low-power Bluetooth module, a Wi-Fi module, and the like. The positioning modules 310, 320, 330, 340 may be provided at the front, ear, left, and right sides of the vehicle 1, respectively, and may independently measure the strength of the wireless signal of the user terminal 20 and transmit the strength to the master module.

The processor 200 may perform the overall control of the vehicle 1. The processor 200 may be configured to execute applications and instructions that are stored in the memory 400.

The processor 200 may be a main CPU for overall control of a vehicle control system 10. In an embodiment, the processor 200 may perform a pairing operation by executing a Bluetooth application to perform communication between the Bluetooth application and the communication device.

The processor 200 may determine a relative position of the user terminal 20 with respect to the vehicle 1. In an embodiment, the relative position may include a distance between the vehicle 1 and the user terminal 20 and a direction in which the user terminal 20 is positioned with respect to the vehicle 1.

For example, the processor 200 may determine the relative position using at least one of the Wi-Fi, Bluetooth, and low-power Bluetooth methods.

The processor 200 may compare the positioning result and the positioning pattern and determine the relative position of the user terminal 20.

For example, the processor 200 may determine the relative position between the vehicle and the user terminal using a received signal strength indicator (RSSI) method that measures the strength of a Wi-Fi signal to estimate a distance.

Alternatively, the processor 200 may determine the relative position between the vehicle and the user terminal using the RSSI method that measures the strength of a Bluetooth signal to estimates a distance.

The memory 400 may store an application and various pieces of data for controlling the vehicle 1 and load the application or read or write the data at the request of the processor 200.

The memory 400 may store at least one algorithm that performs calculation or execution of various commands for operating the vehicle control system 10 according to the embodiment. The memory 400 may include at least one storage medium of a flash memory, a hard disc, a memory card, a read-only memory (ROM), a random access memory (RAM), an electrically erasable programmable ROM (EEPROM), a programmable ROM (PROM), a magnetic memory, a magnetic disc, and an optical disc.

In the following embodiments, an example in which positioning is performed using a Bluetooth signal, and a passive-entry-passive-start (PEPS) operation is controlled will be described.

Figure 3:
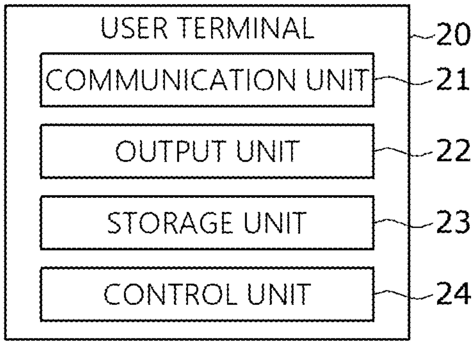
FIG. 3 is a block diagram illustrating a configuration of a user terminal according to the embodiment.

FIG. 3 is a block diagram illustrating a configuration of the user terminal according to the embodiment.

Referring to FIG. 3, the user terminal 20 may include a communication unit 21, an output unit 22, a storage unit 23, and a control unit 24.

The user terminal 20 may include a smartphone, a smart pad, a notebook computer, and the like that the user can carry. The user terminal 20 may store a digital key that generates authentication information for controlling functions such as locking and unlocking of the vehicle door, remote starting, emergency alarm, and trunk opening.

The communication unit 21 may include a transceiver for transmitting and receiving information using an antenna, a communication circuit, a communication processor, and the like and perform short-range communication with the vehicle. According to an embodiment, the communication unit 21 may perform NFC communication or UWB communication.

The output unit 22 may output information stored in the user terminal 20 in at least one of a visual manner, an audible manner, or a combination thereof. According to an embodiment, the output unit 22 may be implemented as a display device that adopts a liquid crystal display (LCD) panel, a light emitting diode (LED) panel, an organic light emitting diode (OLED) panel, a plasma display panel (PDP), or the like. The LCD may include a thin film transistor LCD (TFT-LCD). The output unit 22 may be implemented by being formed (e.g., integrally) with the input unit (not shown) by a touch screen panel (TSP).

The storage unit 23 may store at least one algorithm that performs calculation or execution of various commands for the operation of the user terminal 20 according to one embodiment of the present disclosure. The memory 400 may include at least one storage medium of a flash memory, a hard disc, a memory card, a read-only memory (ROM), a random access memory (RAM), an electrically erasable programmable ROM (EEPROM), a programmable ROM (PROM), a magnetic memory, a magnetic disc, and an optical disc. The storage unit 23 may store driver information for a plurality of vehicles.

The control unit 24 may be implemented by various processing devices such as a microprocessor having a semiconductor chip capable of performing calculations or executions of various commands embedded therein and may control the operation of the user terminal 20 according to the embodiment. The control unit 24 may be electrically connected to the communication unit 21, the output unit 22, and the storage unit 23 through a wired cable or various circuits to transmit electrical signals including control commands and the like and may transmit and receive electrical signals including control commands and the like by various wireless communication networks such as a CAN.

In the vehicle control system 10 according to the embodiment, the user terminal 20 may operate as a digital key 20. Hereinafter, the digital key and the user terminal may be used as terms referring to the same component.

The digital key 20 may open and close the door provided in the vehicle 1, start or stop the vehicle 1, and execute various functions included in the vehicle 1 (e.g., as needed). The digital key 20 may be a device that may use one or more of low-power Bluetooth (BLE) communication and NFC.

One digital key 20 may be operated by being linked to a specific vehicle 1, and a plurality of digital keys 20 may be (e.g., selectively) linked to one vehicle 1 or one digital key 20 may be linked to a plurality of vehicles 1. In addition, there may be a case in which a plurality of digital keys 20 are linked to a plurality of vehicles 1.

In addition, the digital key 20 may be installed and operated in a device such as a smartphone, and there may be a case in which a plurality of digital keys 20 are installed in one smartphone. Although the embodiment describes an example in which the digital key 20 is installed and operated in the smartphone, the present disclosure is not limited thereto, and the digital key 20 may be (e.g., selectively) installed in a device other than the smartphone.

The digital key 20 may control the vehicle 1 and, to this end, may communicate with the vehicle 1 through low-power Bluetooth communication, UWB communication, wireless Internet network communication, or mobile communication network communication.

The digital key 20 may be manipulated by the user to perform various functions for controlling the vehicle 1 and manipulated to set one or more wireless anchors.

The digital key 20 may search for nearby wireless anchors and register the searched wireless anchors. That is, the digital key 20 may use various communication methods to search for wireless anchors that may be communicatively connected in a wireless communication manner. For example, when two wireless anchors are positioned near the digital key 20, one wireless anchor may perform communication through low-power Bluetooth communication and the other may perform communication through wireless Internet network communication, the digital key 20 may be communicatively connected to one of the two wireless anchors or communicatively connected to both wireless anchors.

In an embodiment, the wireless anchor may be the same component as the positioning module.

Figure 4:
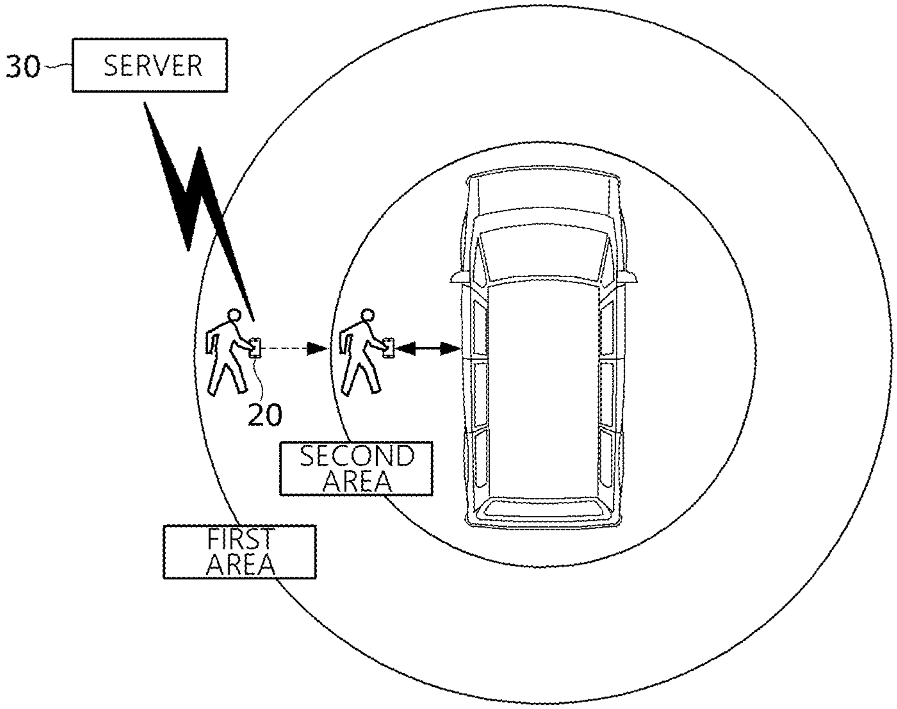
FIG. 4 is a view for describing the operation of a vehicle control system according to the embodiment.

FIG. 4 is a view for describing the operation of a vehicle control system according to the embodiment.

Referring to FIG. 4, the user terminal 20 may determine whether to enter a first area based on the vehicle 1 using a satellite navigation system signal. The user terminal 20 may receive the satellite navigation system signal from the server 30. The user terminal 20 may receive the satellite navigation system signal corresponding to a parking position of the vehicle from the server 30.

In an embodiment, the satellite navigation system signal may be a Global Positioning System (GPS) signal. The GPS signal may include parking position information of the vehicle.

In an embodiment, the first area may be set as a concentric circle area with the vehicle as the origin. A range of the first area may be set using the time (e.g., required) for a vehicle Bluetooth module and the AVNT to switch to a second mode and a walking speed. For example, the range of the first area may be calculated by the processor 200 or the user terminal 20 according to Equation 1 below.

$$R1 = (T1 + T2) * V \qquad \text{[Equation 1]}$$

In Equation 1, R1 denotes a radius value of the first area, T1 denotes the time (e.g., required) for the vehicle Bluetooth module to switch from the first mode to the second mode, T2 denotes the time (e.g., required) for the AVNT to switch from the first mode to the second mode, and V denotes an average walking speed of an adult. For example, V may be set to 4 km/h.

The user terminal 20 may compare the coordinates of the first area with the coordinates of the satellite navigation signal and determine whether the user terminal 20 has entered the first area.

The user terminal 20 may request transmission of a wake-up signal when entering the first area. The user terminal 20 may request the transmission of the wake-up signal for mode switching of the vehicle Bluetooth module and the AVNT when entering the first area to the server 30.

The user terminal 20 may be connected to the Bluetooth module of the vehicle that operates in the second mode when entering the second area based on the vehicle.

In an embodiment, the second area may be set as a concentric circle area with the vehicle as the origin. A range of the second area may be set according to a communication range of the Bluetooth signal. For example, a radius of the second area may be set to 150 meters or less.

In an embodiment, the range of the first area may be set wider than that of the second area. That is, the radius of the first area may be set larger than the radius of the second area, and the second area may be included in the first area.

The user terminal 20 may determine reliability according to an error range of the satellite navigation system signal. The user terminal 20 may stop the wake-up signal transmission request when the reliability of the satellite navigation system signal is a reference level or less.

The GPS signal may include the parking position information of the vehicle, and the parking position information of the vehicle may have a predetermined error range due to the nature of the GPS signal. For example, the GPS signal may have an error (about ±5 meters) due to the influence of the ionosphere, an error (about ±0.5 meters) due to the influence of the atmosphere, a numerical error (about ±1 meter or less), an error (about ±2.5 meters) due to ephemeris, an error (about ±2 meters) due to a satellite clock, and an error (about ±1 meter) due to a propagation path.

For example, the user terminal 20 may determine the reliability of the satellite navigation system signal using a function of the accuracy of GPS position measurement as one of the methods of a position class. The user terminal 20 may determine the reliability of the satellite navigation system signal by adopting a function that returns the position accuracy of the received satellite navigation system signal in meters. The user terminal 20 may determine position accuracy by applying a getAccuracy function to the satellite navigation system signal.

For example, when an accuracy value is 5.0 meters, it may mean that an actual position is likely to be within 5 meters of the measured position.

Alternatively, when the accuracy value is 50.0 meters, it may mean that the actual location is likely to be within 50 meters of the measured position.

The user terminal 20 may determine a distance between the corrected position of the user terminal 20 and the vehicle through the accuracy value. At this time, the user terminal 20 may correct the position of the user terminal 20 using a point that is the farthest from the vehicle according to the accuracy value.

The user terminal 20 may determine that the reliability of the satellite navigation system signal is good when the distance from the vehicle according to the corrected position of the user terminal 20 is a reference distance or less. The user terminal 20 may determine whether to enter the first area using the satellite navigation system signal when it is determined that reliability is good. For example, the reference distance may be set to 8 meters, but is not limited thereto, and may be set and changed according to various conditions such as the parking position of the vehicle, a communication state of the user terminal 20, and weather conditions.

Alternatively, when the accuracy value exceeds the reference distance, the user terminal 20 may determine that the reliability of the satellite navigation system signal is not good. When it is determined that the reliability is not good, the user terminal 20 may not determine whether to enter the first area using the satellite navigation system signal. In this case, the user terminal 20 may not perform the operation of requesting the wake-up signal transmission according to whether to enter the first area.

Figures 5, 6:
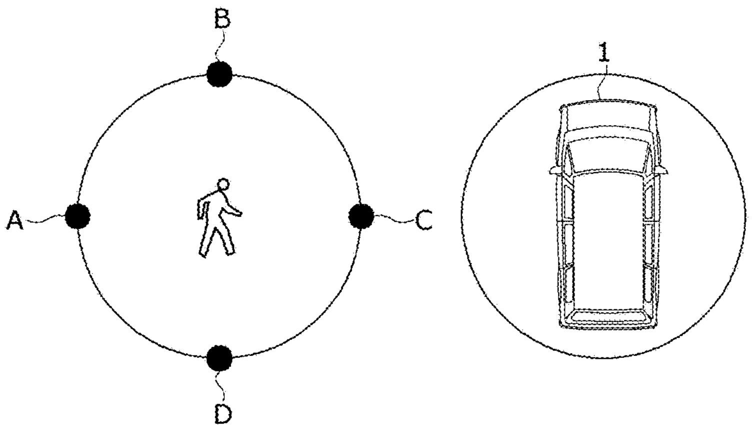
FIG. 5 is a view for describing the operation of a user terminal according to the embodiment.
FIG. 6 is a view for describing the operation of a processor according to the embodiment.

FIG. 5 is a view for describing the operation of a user terminal according to the embodiment. Referring to FIG. 5 (e.g., together), when it is determined that the accuracy value is 5 meters, an error range may be generated with respect to the user terminal 20. The user terminal 20 may compare the point that is the farthest from the vehicle among positions included in the error range with the reference distance and correct the position of the user terminal 20. Therefore, the position of the user terminal 20 may be corrected to point A.

The user terminal 20 may calculate the corrected position of the user terminal 20 and the distance from the vehicle. When a distance between the actual user terminal 20 and the vehicle is 5 meters, the distance between the corrected user terminal 20 and the vehicle is 10 meters. Therefore, the user terminal 20 may determine that the reliability of the satellite navigation system signal is not good, because the distance between the position of the user terminal 20 corrected through the error range and the vehicle exceeds the reference distance.

The server 30 may transmit a wake-up signal to the vehicle in response to the wake-up signal transmission request of the user terminal 20.

In addition, the server 30 may receive and store a satellite navigation system signal corresponding to the parking position from the vehicle and transmit the satellite navigation system signal to the user terminal 20.

The processor 200 of the vehicle may switch operation modes of the Bluetooth module of the vehicle and the AVNT from the first mode to the second mode in response to the wake-up signal.

FIG. 6 is a view for describing the operation of a processor according to the embodiment. Referring to FIG. 6 (e.g., together), in an embodiment, the first mode may be a sleep mode or a power-saving mode, and the second mode may be a normal mode or a standby mode. The Bluetooth module of the vehicle does not perform a connection operation with the user terminal 20 in the first mode, that is, the power-saving mode, and may perform the connection operation with the user terminal 20 when entering the second mode, that is, the normal mode.

In addition, the AVNT does not transmit and receive data through a CAN in the first mode, that is, the sleep mode, and may perform data transmission and reception with electronic components of the vehicle when entering the second mode, that is, the standby mode.

Therefore, when the processor 200 of the vehicle receives the wake-up signal from the server 30, the processor 200 may switch the Bluetooth module of the vehicle to the second mode and put the Bluetooth module on standby so that the connection with the user terminal 20 is performed immediately when the user terminal 20 enters the second area.

In addition, when the processor 200 of the vehicle receives the wake-up signal from the server 30, the processor 200 may switch the AVNT of the vehicle to the second mode and put the AVNT on standby so that the PEPS function is performed immediately when the user terminal 20 enters the second area.

The PEPS function may be a function that automatically performs operations such as door lock/unlock and/or vehicle starting after estimating the position of a smartphone through a communication module mounted on a vehicle. For example, the processor 200 may estimate the relative position of the user terminal 20 with respect to the vehicle using the signal strength of the Bluetooth signal received from the user terminal 20 connected to the Bluetooth module. The processor 200 may provide a passive entry function when the estimated position of the user terminal 20 approaches the vehicle and provide a passive start function when the estimated position of the user terminal 20 is inside the vehicle.

When the user terminal 20 does not enter the second area within a preset threshold time after switching to the second mode, the processor 200 may switch the operation modes of the vehicle Bluetooth module and the AVNT from the second mode to the first mode. That is, when the user terminal 20 does not enter the second area after switching to the second mode, the vehicle Bluetooth module and the AVNT may (e.g., continuously) consume standby power. Therefore, when the processor 200 does not perform Bluetooth connection with the user terminal 20 within a predetermined time from a time point at which the operation modes are switched to the second mode, the processor 200 can prevent the consumption of unnecessary standby power by switching the operation modes of the vehicle Bluetooth module and the AVNT from the second mode back to the first mode.

The processor 200 may set the threshold time using the range of the first area, the range of the second area, and the walking speed (e.g., of a user or adult).

For example, the processor 200 may set the threshold time according to Equation 2 below.

$$Twa = (R1 - R2)/V * a \quad \text{[Equation 2]}$$

In Equation 2, Tw denotes the threshold time, R1 denotes the radius value of the first area, R2 denotes the radius value of the second area, V denotes the average walking speed of an adult, and a denotes a correction parameter. For example, V may be set to 4 km/h. The correction parameter is a parameter applied to provide a margin time for the time for which the user terminal enters the second area from the time point at which the user terminal enters the first area and may have a value of, for example, 1.1 to 1.5 in consideration of the walking speed of an adult.

When parking of the vehicle is completed, the processor 200 may transmit the parking position information of the vehicle measured through the satellite navigation system to the server 30.

For convenience, one or more figures are described by way of an example in which the steps are performed by a processor circuit. One, some, or all steps of the example method of a figure, or portions thereof, may be performed by one or more other circuits. One or some, steps of the example method of a figure may be omitted, performed in other orders, and/or otherwise modified, and/or one or more additional steps may be added.

Figure 7:
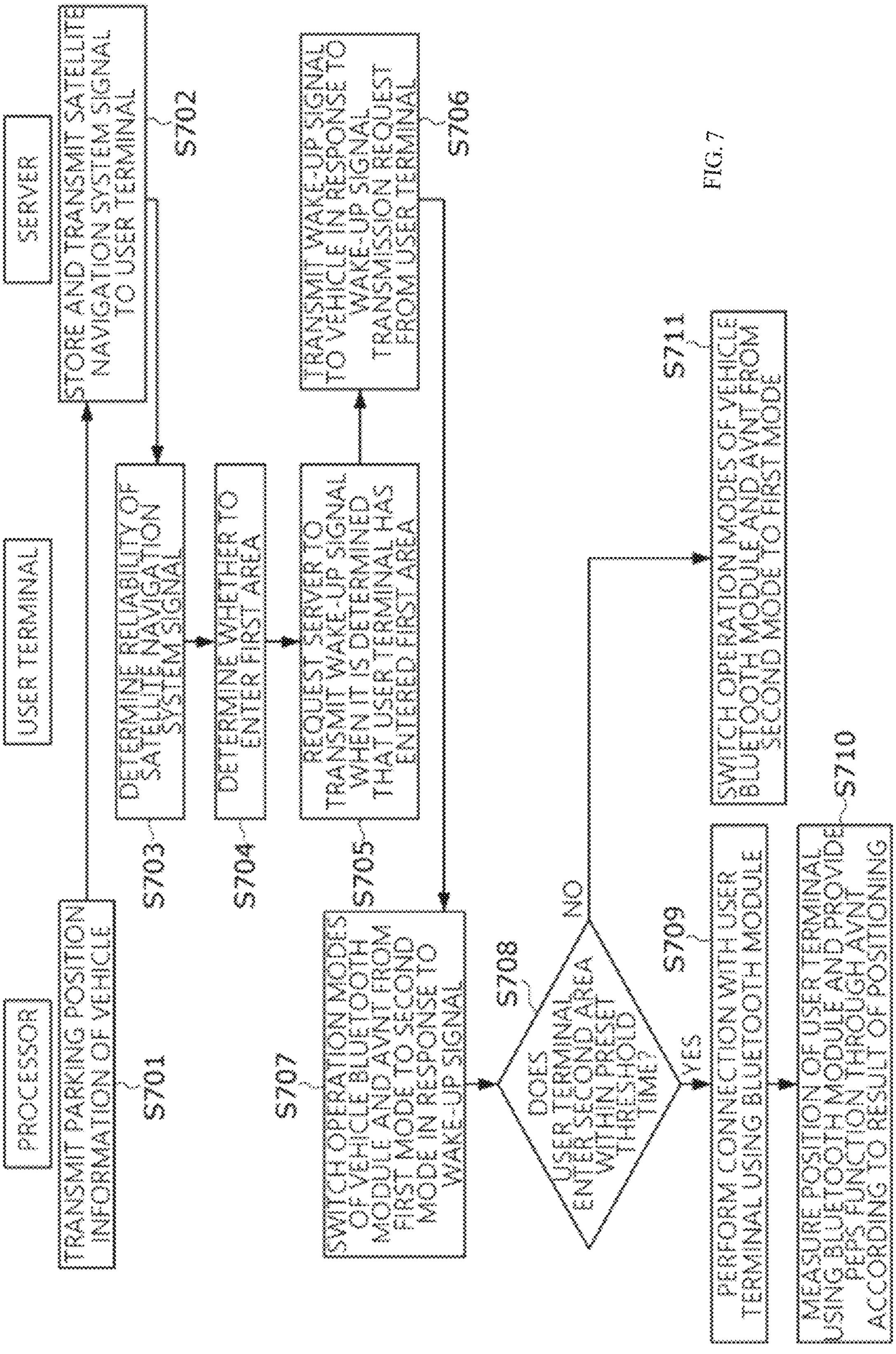
FIGS. 7 and 8 are flowcharts of vehicle control methods according to embodiments.

FIG. 7 is a flowchart of a method of controlling a vehicle according to an embodiment. Referring to FIG. 7, first, when the parking of the vehicle is completed, a processor transmits parking position information of the vehicle measured through a satellite navigation system to a server (S701).

Next, the server receives and stores a satellite navigation system signal corresponding to the parking position from the vehicle and transmits the satellite navigation system signal to a user terminal (S702).

Next, the user terminal determines the reliability of the satellite navigation system signal received from the server (S703).

Next, the user determines whether to enter a first area with respect to the vehicle using the satellite navigation system signal determined to have (e.g., good) reliability (S704).

Next, when it is determined that the user terminal has entered the first area, the user terminal requests the server to transmit a wake-up signal (S705).

Next, the server transmits the wake-up signal to the vehicle in response to the wake-up signal transmission request from the user terminal (S706).

Next, the vehicle processor switches operation modes of a vehicle Bluetooth module and an AVNT from a first mode to a second mode in response to the wake-up signal (S707).

Next, the vehicle processor performs connection with the user terminal using the Bluetooth module when the user terminal enters a second area within a preset threshold time (S708 and S709).

Next, the vehicle processor measures the position of the user terminal using the Bluetooth module and provides a PEPS function through the AVNT according to the result of the (e.g., positioning) measurement (S710).

Alternatively, when the user terminal does not enter the second area, the processor switches the operation modes of the vehicle Bluetooth module and the AVNT from the second mode to the first mode (S711).

Figure 8:
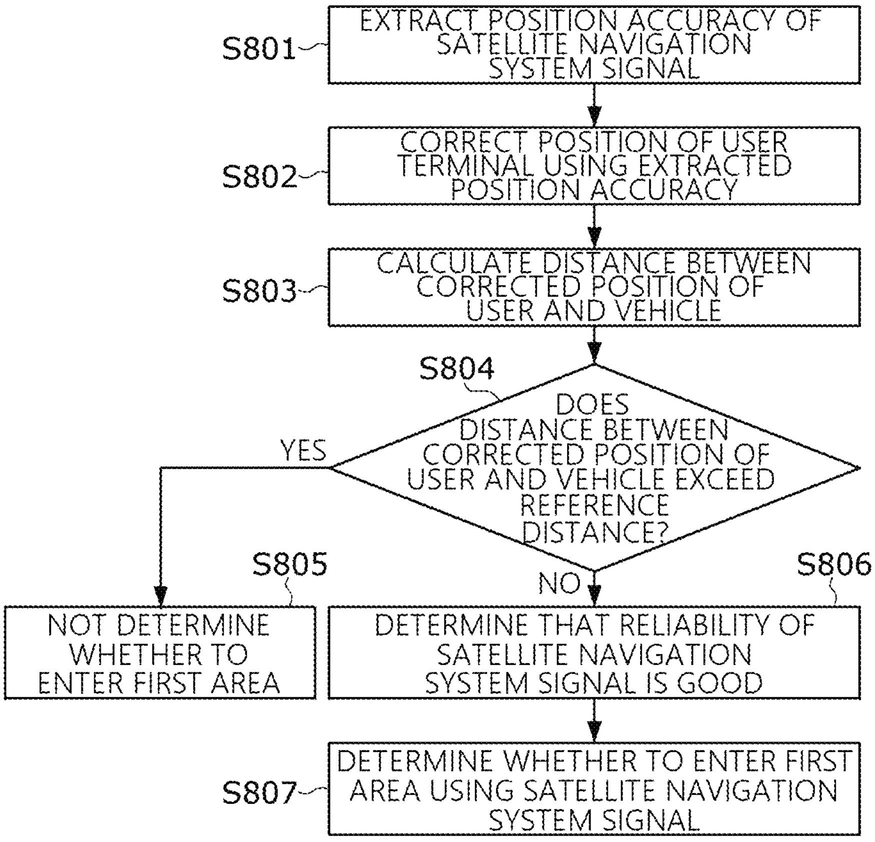

FIG. 8 is a flowchart of a method of controlling a vehicle according to an embodiment. FIG. 8 is intended to describe the process of determining the reliability of the satellite navigation system signal of FIG. 7 in more detail.

Referring to FIG. 8, when the user terminal receives the satellite navigation system signal from the server, the user terminal extracts the position accuracy of the received satellite navigation system signal using the accuracy of a GPS position measurement function (S801).

Next, the user terminal corrects the position of the user terminal using the extracted position accuracy. The user terminal sets an error range using a meter value of the position accuracy and corrects a point that is the farthest distance from the vehicle among positions included in the error range to the position of the user terminal (S802).

Next, the user terminal calculates a distance between the corrected user position and the vehicle (S803).

Next, the user terminal compares the distance between the corrected user position and the vehicle with a reference distance (S804).

Next, the user terminal determines that the reliability of the satellite navigation system signal is not good when the distance from the vehicle according to the corrected position exceeds the reference distance. The user terminal does not determine whether to enter the first area when the satellite navigation system signal is not good. In this case, the user terminal does not perform an operation requesting wake-up signal transmission according to whether to enter the first area (S805).

Alternatively, the user terminal determines that the reliability of the satellite navigation system signal is good when the distance from the vehicle according to the corrected position of the user terminal is the reference distance or less (S806).

Next, the user terminal determines whether to enter the first area using the satellite navigation system signal determined to have good reliability (S807).

The term "~unit" used in the present embodiment may describe a software or hardware component such as a field-programmable gate array (FPGA) or an ASIC, and the "~unit" performs certain roles. However, the "unit" is not limited to software or hardware. The "unit" may be configured to be disposed in an addressable storage medium and configured to reproduce one or more processors. Therefore, as an example, the "unit" is components such as software components, object-oriented software components, class components, and task components, processes, functions, attributes, procedures, subroutines, segments of program code, drivers, firmware, microcode, circuits, data, database, data structures, tables, arrays, and variables. Functions provided in the components and "~units" may be combined into the smaller number of components and "unit" or separated into additional components and "units." Additionally, the components and "~units" may be implemented to reproduce one or more CPUs in a device or a security multimedia card.

A vehicle control system and method according to embodiments can recognize a digital key approaching a vehicle in a Bluetooth communication shadow area to automatically perform a preliminary operation for providing Bluetooth connection and a PEPS function.

Therefore, Bluetooth connection can be (e.g., quickly) performed.

In addition, the PEPS function can be (e.g., immediately) provided.

In addition, it is possible to resolve a vehicle owner's frustration occurring due to time delay in a process of using the digital key.

Although the present disclosure has been described above with reference to exemplary embodiments, those skilled in the art will understand that the present disclosure may be modified and changed variously without departing from the spirit and scope of the present disclosure as described in the appended claims.

What is claimed is:

1. A vehicle control system comprising:

a user terminal configured to determine whether to enter a first area with respect to a vehicle using a satellite navigation system signal and request a wake-up signal transmission when entering the first area;

a server configured to transmit a wake-up signal to the vehicle in response to the wake-up signal transmission request from the user terminal; and a processor configured to switch operation modes of a Bluetooth module of the vehicle and an audio video navigation and telematics (AVNT) from a first mode to a second mode in response to the wake-up signal, wherein the user terminal is connected to the Bluetooth module of the vehicle that operates in the second mode when entering a second area with respect to the vehicle, wherein the first area and the second area have ranges set with respect to the vehicle by the processor or the user terminal, and the range of the first area is wider than that of the second area, and wherein the range of the first area is set using a time for the Bluetooth module of the vehicle and the AVNT to switch to the second mode and a walking speed.

2. The vehicle control system of claim 1, wherein, when the user terminal does not enter the second area within a preset threshold time after switching to the second mode, the processor switches the operation modes of the Bluetooth module of the vehicle and the AVNT from the second mode to the first mode.

3. The vehicle control system of claim 2, wherein the threshold time is set using the range of the first area, the range of the second area, and the walking speed.

4. The vehicle control system of claim 1, wherein the processor transmits parking position information of the vehicle measured through the satellite navigation system to the server when parking of the vehicle is completed.

5. The vehicle control system of claim 4, wherein the user terminal receives the satellite navigation system signal corresponding to a parking position of the vehicle from the server.

6. The vehicle control system of claim 1, wherein the user terminal determines reliability according to an error range of the satellite navigation system signal.

7. The vehicle control system of claim 6, wherein the user terminal stops the wake-up signal transmission request when the reliability of the satellite navigation system signal is a reference level or less.

8. The vehicle control system of claim 1, wherein the first mode is a sleep mode or a power-saving mode, and the second mode is a normal mode or a standby mode.

9. A vehicle control method comprising:

determining, by a user terminal, whether to enter a first area with respect to a vehicle using a satellite navigation system signal;

requesting, by the user terminal, a server to transmit a wake-up signal when it is determined that the user terminal has entered the first area;

transmitting, by the server, the wake-up signal to the vehicle in response to the wake-up signal transmission request from the user terminal; and switching, by a processor of the vehicle, operation modes of a Bluetooth module of the vehicle and an audio video navigation and telematics (AVNT) from a first mode to a second mode in response to the wake-up signal, and connecting the user terminal to the Bluetooth module of the vehicle that operates in the second mode when entering a second area with respect to the vehicle, wherein the first area and the second area have ranges set with respect to the vehicle by the processor or the user terminal, and the range of the first area is wider than that of the second area, and wherein the range of the first area is set using a time for the Bluetooth module of the vehicle and the AVNT to switch to the second mode and a walking speed.

10. The vehicle control method of claim 9, further comprising:

by the processor, determining whether the user terminal has entered the second area within a preset threshold time; and switching the operation modes of the Bluetooth module of the vehicle and the AVNT from the second mode to the first mode when the user terminal does not enter the second area.

11. The vehicle control method of claim 10, wherein the threshold time is set using the range of the first area, the range of the second area, and the walking speed.

12. The vehicle control method of claim 9, further comprising, before the determining of whether to enter the first area, transmitting, by the processor, parking position information of the vehicle measured through the satellite navigation system to the server when parking of the vehicle is completed.

13. The vehicle control method of claim 9, further comprising, before the determining of whether to enter the first area, receiving, by the user terminal, the satellite navigation system signal corresponding to a parking position of the vehicle from the server.

14. The vehicle control method of claim 9, further comprising: before the determining of whether to enter the first area, determining, by the user terminal, reliability according to an error range of the satellite navigation system signal; and stopping, by the user terminal, the wake-up signal transmission request when the reliability of the satellite navigation system signal is a reference level or less.

* * * * *